United States Patent [19]

Henrichs et al.

[11] Patent Number: 5,214,937
[45] Date of Patent: Jun. 1, 1993

[54] INTEGRAL OIL SEPARATOR AND MUFFLER

[75] Inventors: Anton D. Henrichs, Canastota; Thomas S. Katra, Fayetteville, both of N.Y.

[73] Assignee: Carrier Corporation, Syracuse, N.Y.

[21] Appl. No.: 783,732

[22] Filed: Oct. 28, 1991

[51] Int. Cl.⁵ ............................................. F25B 43/02
[52] U.S. Cl. ............................................ 62/468; 62/84; 62/296; 181/403
[58] Field of Search ............. 62/84, 296, 468, 470, 62/512; 55/320, 321, 323, 325, 326; 181/403, 264

[56] References Cited

U.S. PATENT DOCUMENTS

| | | | |
|---|---|---|---|
| 1,405,259 | 1/1922 | Beach | 55/323 X |
| 1,664,670 | 4/1928 | Dollins | 55/323 X |
| 2,795,103 | 6/1957 | Jenison | 55/325 X |
| 2,894,599 | 7/1959 | Leininger | 55/325 |
| 2,910,136 | 10/1959 | Valliant et al. | 55/320 X |
| 3,010,537 | 11/1961 | Baker et al. | 55/323 |
| 3,070,977 | 1/1963 | Kimmel et al. | 62/84 X |
| 3,084,523 | 4/1963 | Bottum et al. | 62/296 |
| 3,408,828 | 11/1968 | Soumerai et al. | 62/470 |
| 3,778,984 | 12/1973 | Lawser | 62/84 X |
| 4,333,754 | 6/1982 | Peter | 181/403 X |
| 4,666,473 | 5/1987 | Gerdau | 55/320 X |
| 4,692,175 | 9/1987 | Frantz | 55/323 X |
| 4,746,277 | 5/1988 | Glanvall | 62/296 |
| 4,788,825 | 12/1988 | Calupca et al. | 62/84 |
| 4,924,966 | 5/1990 | Kanda et al. | 181/264 X |
| 4,957,517 | 9/1990 | Linnert | 62/84 X |

FOREIGN PATENT DOCUMENTS 1155400  10/1983  Canada ......................... 181/403

Primary Examiner—Henry A. Bennet
Assistant Examiner—C. Kilner

[57] ABSTRACT

A muffler and an oil separator located within a common shell. The muffler includes a plurality of chambers tuned to different frequencies. The flow path is serially through the muffler into contact with an agglomerating pad followed by flow through demister pads and a coalescer.

5 Claims, 4 Drawing Sheets

5,214,937

INTEGRAL OIL SEPARATOR AND MUFFLER

BACKGROUND OF THE INVENTION

Screw compressors employed in refrigeration applications commonly use oil for sealing, lubricating and cooling. The oil is injected into the working chamber of the compressor and thus into the refrigerant gas being compressed. As a result, the pulsating compressor discharge ordinarily contains oil entrained in the compressed refrigerant gas. The presence of oil interferes with the heat exchange function of the refrigeration system and otherwise degrades the efficiency of the system. The pulsating discharge gas is one of the most significant causes of radiated noise in screw compressors. Generally, the amount of oil carried over to the system is kept as low as possible in order to minimize the degrading of the heat transfer surfaces, to minimize the delivery of oil to remote locations in the system and to keep a sufficient oil supply in the oil sump for sealing, lubricating and cooling needs. The oil removal or separation ordinarily takes place at a convenient place between the compressor discharge and the condenser. A muffler to reduce the discharge pulsations is located at a convenient location near the compressor discharge.

SUMMARY OF THE INVENTION

The present invention locates the muffler in the oil separator and employs a plurality of flow direction changes in the muffler and the oil separator in combination with a discharge deflector, demisters and a coalescer to remove and collect oil entrained in the refrigerant gas. By locating the muffler upstream of the oil separator, the discharge pulsations in the refrigerant flow will be reduced thereby significantly reducing the radiated noise from the oil separator. Except for oil removed in the coalescer, all of the separated oil drains directly into the main oil sump. The refrigerant gas and entrained oil is subjected to at least two impingements with a resulting change in direction to inertially remove as much oil as possible prior to reaching and passing through the demisters where the amount of oil removal has a direct, temporary effect on the demisters and their flow resistances as the entrained oil impinges, collects and drains to the sump.

It is an object of this invention to provide efficient oil separation for a screw compressor.

It is a further object of this invention to decrease the first few harmonics of the pressure pulsations in the compressor discharge flow.

It is another object of this invention to facilitate the return of the oil trapped in the muffler to the main oil sump.

It is an additional object of this invention to provide an integral oil separator and muffler.

It is another object of this invention to provide an oil separator which drains most of the separated oil directly to the main oil sump. These objects, and others as will become apparent hereinafter, are accomplished by the present invention.

Basically the discharge gas from a screw compressor is directed radially and in a generally horizontal direction into the integral oil separator and muffler where it impinges upon the discharge deflector located at the inlet of the muffler portion. Impingement of the discharge flow with the discharge deflector produces a 90° directional flow change with a portion of the oil collecting in an oil pool and/or on the deflection surface due to inertial forces as the flow direction changes. The flow is then directed into the muffler which consists of a series of chambers each having nonaligned tubular inlets and outlets whereby flow directions are changed with some impingement and reverberation of the flow taking place. Each chamber is tuned to a desired waveband. Attenuated flow from the muffler impinges on a mesh pad defining a demister and lining the end of the housing whereby the flow is diverted 180°. The flow then passes through two demisters defined by mesh pads and into a coalescer. The flow passes through the walls of the coalescer leaving any entrained oil trapped in the coalescing media of the element. The coalesced oil gathers on the outside diameter of the coalescer and flows into the secondary oil sump. The refrigerant gas, now nearly oil free, exits the separator and is delivered to the condenser of the refrigeration system.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
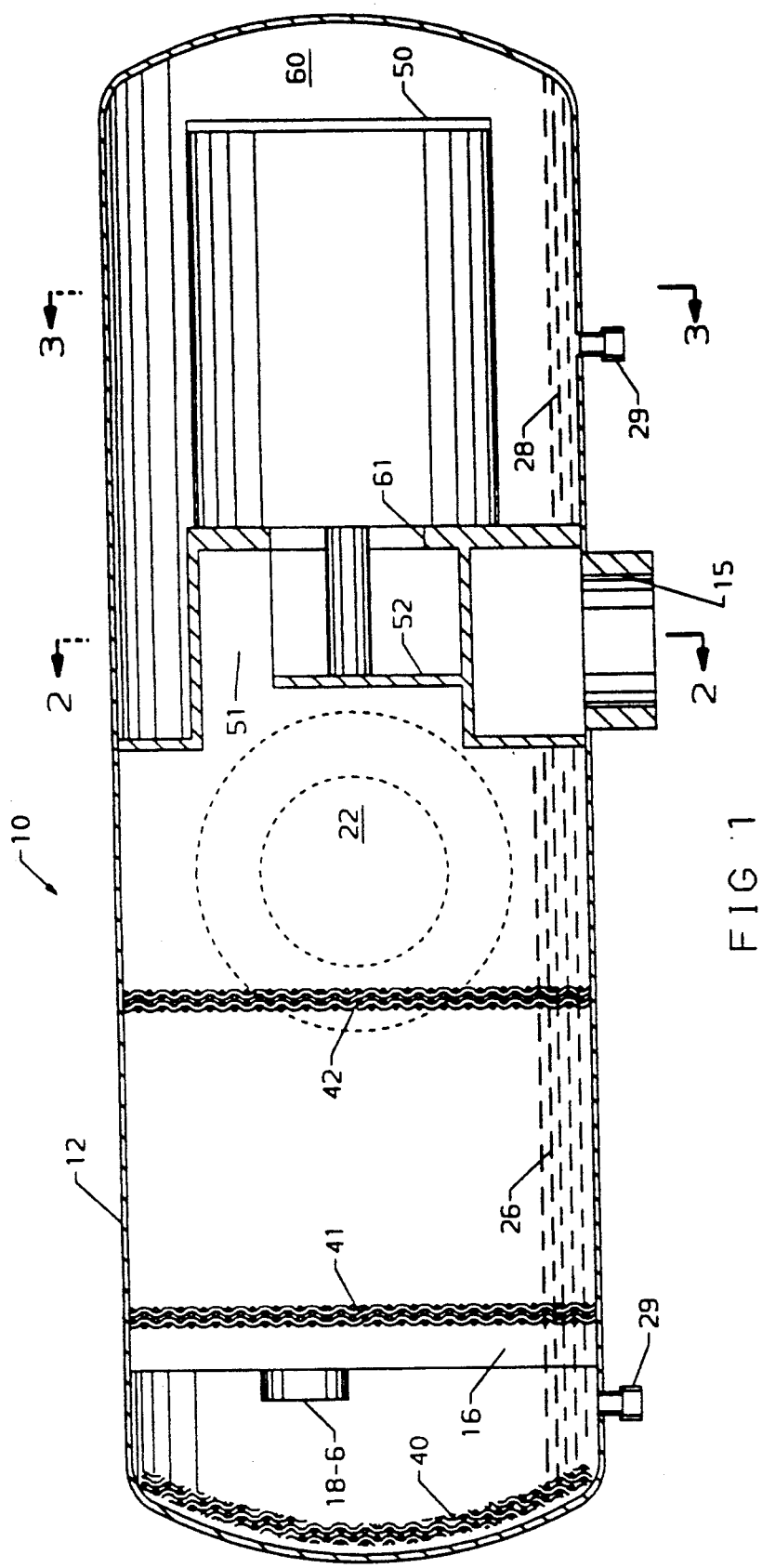
FIG. 1 is a vertical sectional view of the integral oil separator and muffler of the present invention taken along line 1—1 of FIG. 4 with the coalescer shown unsectioned.
Figure 4:
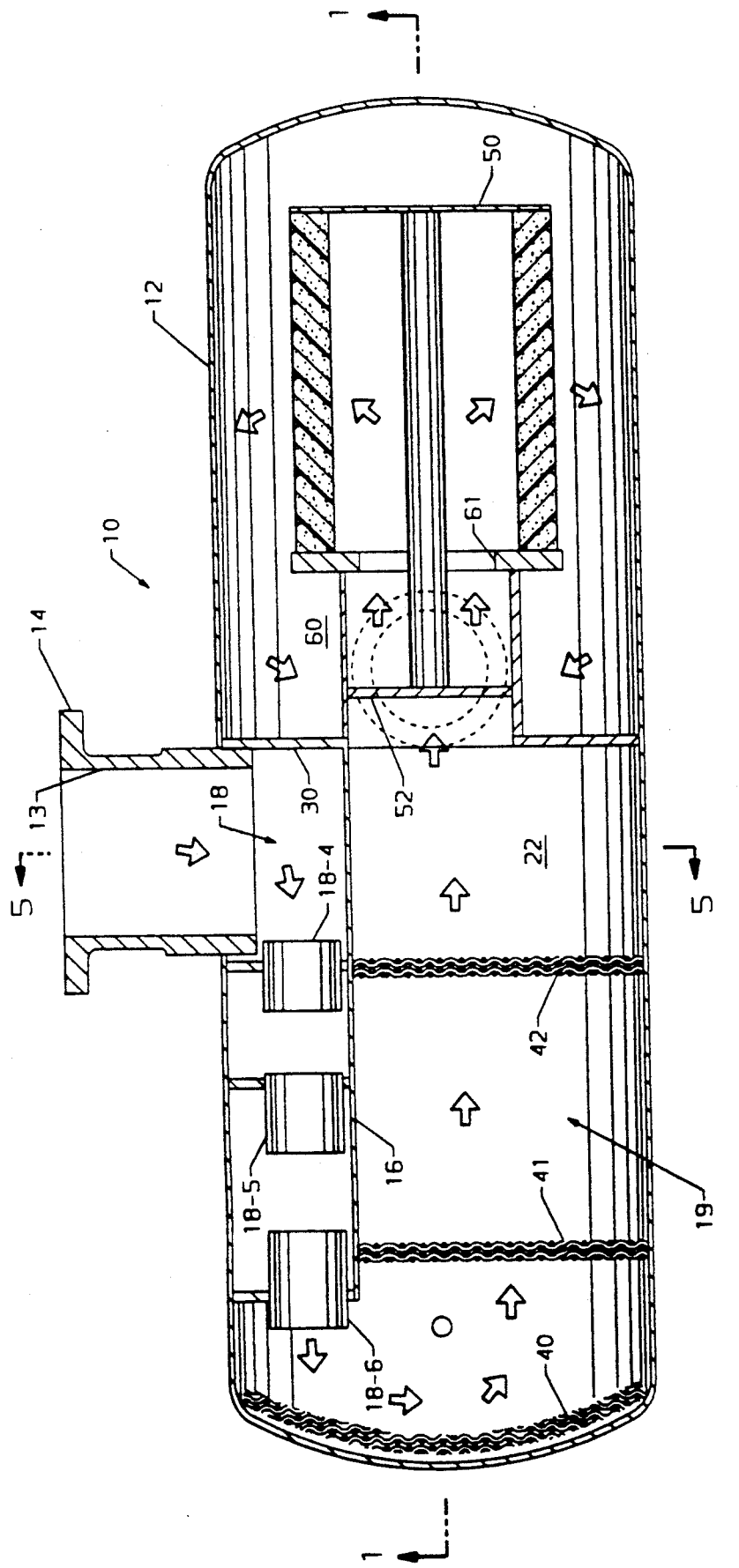
FIG. 4 is a partially sectioned cut away top view of the integral oil separator and muffler of the present invention.
Figure 5:
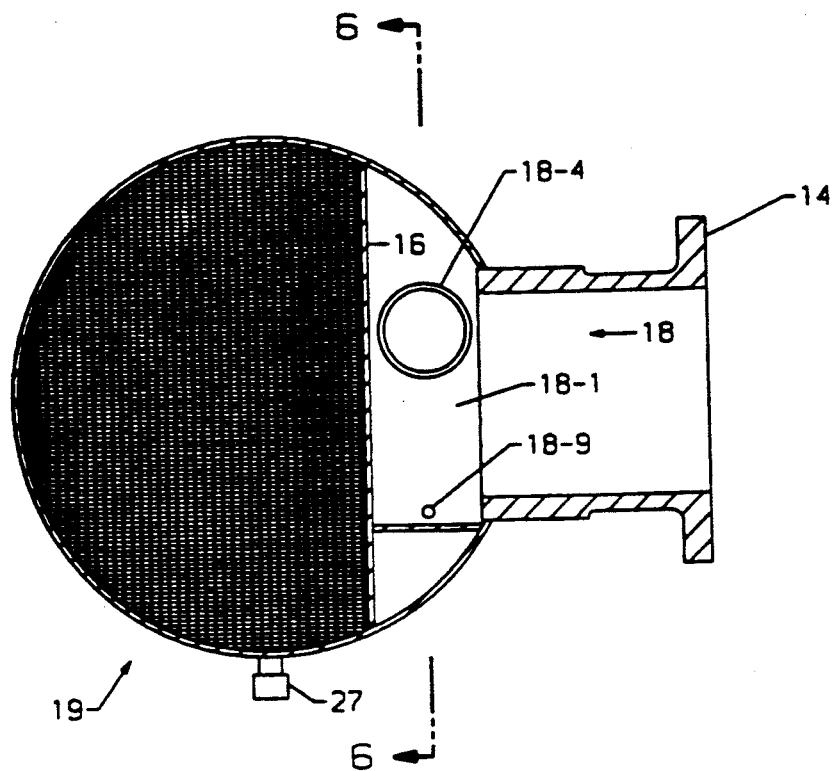
FIG. 5 is sectional view taken along line 5—5 of FIG. 4.

In the Figures, the numeral 10 generally indicates the integral oil separator and muffler of the present invention. The external portion of the oil separator 10 is an essentially cylindrical shaped casing 12 having an inlet 13 with a flange 14 and an outlet 15. Casing 12 is partitioned by divider plate 16 which, as best shown in FIGS. 1 and 4, does not extend the full length of casing 12. Divider plate 16 is welded to and divides casing 12 into muffler 18 and oil separator 19. Referring now to FIG. 5, it will be noted that divider plate 16 divides the casing 12 into a major segment of a circle which defines oil separator 19 and a minor segment of a circle which defines muffler 18.

Figure 2:
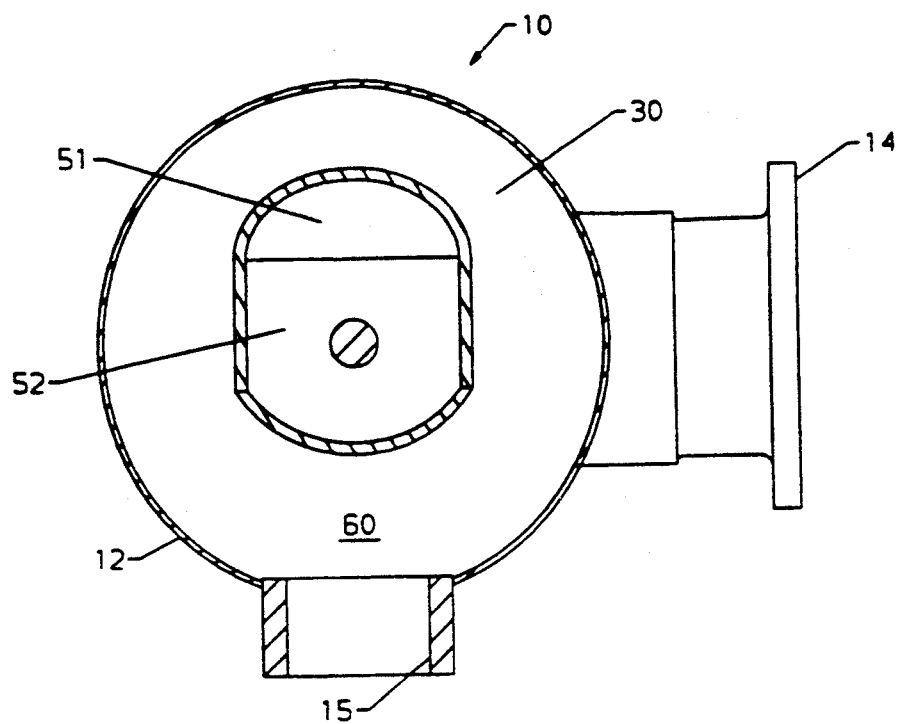
FIG. 2 is a sectional view taken along line 2—2 of FIG. 1.
Figure 3:
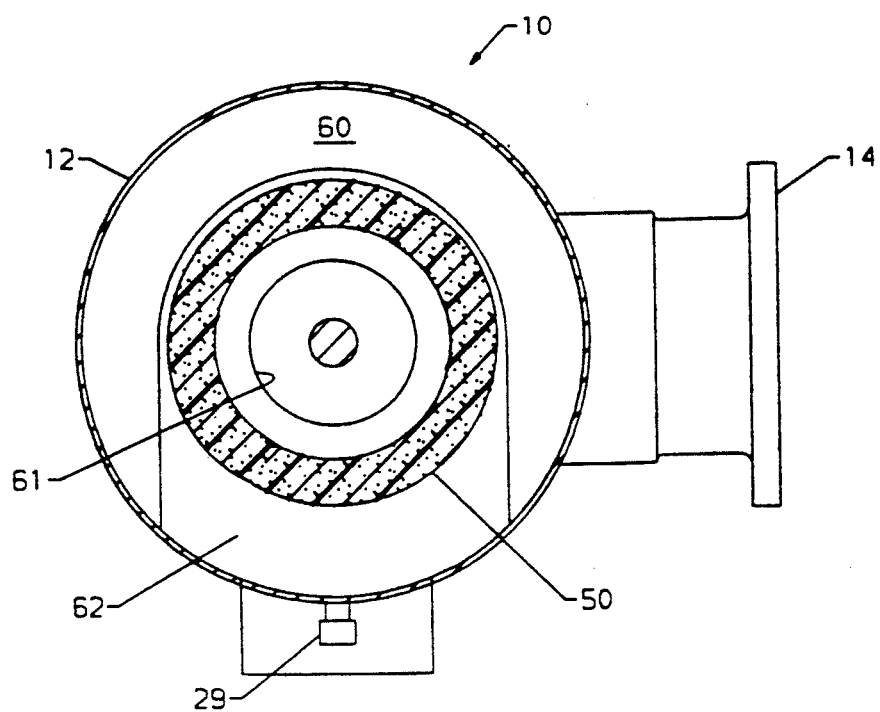
FIG. 3 is a sectional view taken along line 3—3 of FIG 1.
Figure 6:
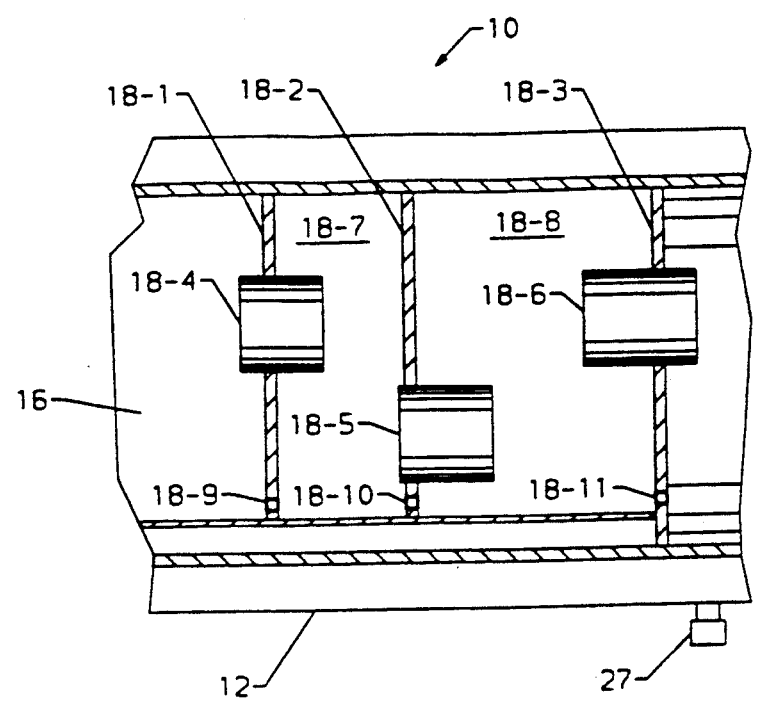
FIG. 6 is a sectional view taken along line 6—6 of FIG. 5.

A horizontal screw compressor (not illustrated) is attached to flange 14 of inlet 13 by bolts (not illustrated). As the first step of oil removal, a partition 30 is provided at one end of muffler 18 and acts as a discharge deflector, as best shown in FIG. 4, and coacts with divider plate 16 to deflect flow entering inlet 13 into muffler 18. As best shown in FIG. 2, discharge deflector 30 is generally annular and provides a partition relative to casing 12. Referring to FIGS. 4–6, it will be noted that muffler 18 includes three partitions 18-1, 18-2 and 18-3 having tubes or pipes 18-4, 18-5 and 18-6, respectively, extending therethrough. A first chamber 18-7 is formed between partitions 18-1 and 18-2 and a second chamber 18-8 of a different size and acoustical properties is formed between partitions 18-2 and 18-3. Tubes 18-4, 18-5 and 18-6 are of different lengths and coact with the different sized chambers 18-7 and 18-8 so as to attenuate different chosen frequencies. Oil drain holes 18-9, 18-10 and 18-11 are formed in partitions 18-1, 18-2 and 18-3, respectively, near their bottoms, at progressively lower heights. The flow entering inlet 13 goes through a 90° turn due to the coation of deflector 30 and divider plate 16. Any oil separating out will collect and flow through oil drain hole 18-9 when the level thereof becomes high enough. The flow then passes through tube 18-4 into chamber 18-7. Because tubes 18-4 and 18-5 are not aligned the flow tends to reverberate in chamber 18-7 before exiting via tube 18-5. Any oil separating out plus any oil entering chamber 18-7 via drain hole 18-9 will collect and flow through drain hole 18-10 into chamber 18-8 when the level thereof becomes high enough. Tube 18-5 is of a different length than tube 18-4 to be responsive to different frequencies. Flow passing through tube 18-5 goes into chamber 18-8 which has different acoustical properties than chamber 18-7 so as to capture different frequencies. Because tubes 18-5 and 18-6 are not aligned the flow tends to reverberate in chamber 18-8 before exiting via tube 18-6. Any oil separating out plus any oil entering chamber 18-8 via drain hole 18-10 will collect and flow through drain hole 18-11 into major oil sump 26 when the level thereof becomes high enough. The turning of the flow due to the coaction of deflector 30 and divider plate 16 as well as the reverberation and dwell time of the flow in chambers 18-7 and 18-8 thus causes oil to separate out of the flow, as noted, and collect on partitions 18-1, 18-2 and 18-3, plate 16 and the inner wall of shell 12. The separated oil tends to flow downwardly and drains into oil separator 19 and major oil sump 26 as described above.

As is best shown by the flow indicating arrows in FIG. 4, the flow exiting muffler 18 via tube 18-6 into chamber 22 impinges upon agglomerating mesh pad 40 which forms a liner with respect to the end of casing 12 and causes the flow to be diverted 180° while removing and collecting some oil therefrom. The removed oil flows by gravity into main oil sump 26. The refrigerant gas, which now contains only fine droplets or a mist of oil, passes serially through demister pads 41 and 42, respectively, which, as best shown in FIG. 1, are partially immersed in main oil sump 26. The demister pads 41 and 42 remove oil by impingement and as the oil gathers in the fine wire mesh of the pads, it drains downwardly by gravity to maintain the oil reservoir defined by main oil sump 26. Demister pads can extract as much as 99.9% of the oil still in circulation when it reaches the demister pads. The preliminary removal of the large oil droplets is therefore necessary to prevent overwhelming the demister pads and greatly increasing flow resistance.

As the now relatively oil-free refrigerant gas passes through demister pad 42 into coalescer 50, it must make another 180° change in direction since, as best shown in FIGS. 1 and 2, the only exit from chamber 22 in oil separator 19 is via radially displaced opening 51 in plate 52 followed by opening 61 in plate 62 which opens into coalescer 50. Coalescer 50 is, in part, made of fiberglass and is of a generally annular cylindrical shape and with no openings other than 61 which serves only as an inlet. The refrigerant gas entering coalescer 50 via opening 61 must pass through the cylindrical fiberglass walls to reach chamber 60 thereby leaving any entrained oil trapped in the coalescing media of coalescer 50. The coalesced oil gathers on the outside surface of coalescer 50 and drops downward, by gravity, as gravitational forces in the collected oil overcome viscous forces and collects in secondary oil sump 28.

The oil collected and maintained in oil sumps 26 and 28 is withdrawn via outlets 27 and 29, respectively, and is either reinjected into a lower pressure area of the compressor by pressure differential or passed through a pump (not illustrated) where its pressure is raised to be delivered back to the compressor. The oil is injected into the compressor to seal, lubricate and cool the mechanism.

Although a preferred embodiment of the present invention has been illustrated and described, other changes will occur to those skilled in the art. For example, the number of chambers in muffler 18 can be increased and the sumps can be connected. It is therefore intended that the scope of the present invention is to be limited only by the scope of the appended claims.

What is claimed is:

1. An integral oil separator and muffler comprising:
   a closed casing means having an inlet and an outlet;
   partition means dividing a portion of said casing means into a muffler portion and an oil separator portion;
   said muffler portion including a plurality of chambers of different acoustical properties with said muffler portion providing a fluid path between said inlet and said oil separator portion;
   said oil separator portion including a deflecting means facing said muffler portion whereby flow from said muffler portion is turned approximately 180°;
   said oil separator portion further including a flow path including demister means and coalescing means before passing through said outlet.

2. The integral oil separator and muffler of claim 1 further including sump means located in said casing means and in fluid communication with both said muffler portion and said oil separator portion whereby oil separated out in said portions can drain into said sump means.

3. An integral oil separator and muffler means comprising:
   closed, horizontally oriented generally cylindrical casing means having an axially spaced horizontal inlet and a generally downwardly directed outlet;
   radially extending partition means located axially between said inlet and said outlet and dividing said casing means into a first portion including said inlet and a second portion including said outlet;
   axially extending partition means in said first portion dividing said first portion into a muffler portion and an oil separation portion;
   said muffler portion including a plurality of axially spaced chambers of different acoustical properties with said muffler portion providing a fluid path between said inlet and said oil separation portion;
   said oil separation portion including a deflecting means facing said muffler portion whereby flow from said muffler portion is turned approximately 180° towards said radially extending portion means;
   said oil separation portion further including demister means located intermediate said deflecting means and said radially extending portion means;

coalescer means located in said second portion;
passage means in said radially extending portion means whereby a continuous flow path is defined from said oil separation portion, through said passage means into said coalescer means, through said coalescer means to said outlet.

4. The integral oil separator and muffler means of claim 3 wherein said axially extending partition is vertically oriented.

5. The integral oil separator and muffler means of claim 3 further including sump means located in said first portion and in fluid communication with both said muffler portion and said oil separation portion.

* * * * *